Dec. 12, 1950  W. H. WANNAMAKER, JR  2,533,411
ELECTRIC PROPORTIONING CONTROL
APPARATUS WITH RESET

Original Filed Dec. 12, 1945  2 Sheets-Sheet 1

*INVENTOR.*
WILLIAM H. WANNAMAKER JR
BY Arthur H. Swanson
ATTORNEY.

Dec. 12, 1950

W. H. WANNAMAKER, JR  
ELECTRIC PROPORTIONING CONTROL  
APPARATUS WITH RESET 2,533,411

Original Filed Dec. 12, 1945

*INVENTOR.*
WILLIAM H. WANNAMAKER JR

BY *Arthur H. Swanson*

ATTORNEY.

Patented Dec. 12, 1950

2,533,411

UNITED STATES PATENT OFFICE 2,533,411

ELECTRIC PROPORTIONING CONTROL APPARATUS WITH RESET

William H. Wannamaker, Jr., Flourtown, Pa., assignor, by mesne assignments, to Minneapolis-Honeywell Regulator Company, Minneapolis, Minn., a corporation of Delaware Original application December 12, 1945, Serial No. 634,556. Divided and this application December 24, 1947, Serial No. 793,678

5 Claims. (Cl. 175—335)

The present invention is a division of my prior application, Serial No. 634,556, filed December 12, 1945, now Patent No. 2,446,163, which discloses an electrical control apparatus of the proportioning type characterized by the inclusion of novel and effective means for automatically making reset adjustments which vary in magnitude and rate with the magnitude of the variations in the control quantity or condition which create the need for the reset adjustments. More specifically, said prior application discloses a control apparatus of the type specified, in which the motor used to actuate such relatively high power, slow moving mechanism as is required to position a control valve in response to potentiometer measurements, and the motor for accomplishing the desired reset adjustments, may alternately be controlled by electromagnetic relays having their coils actuated by the output currents of an electronic amplifier.

An object of the present invention is to provide an electronic amplifier and relay arrangement suitable for effecting such control of a control motor and a reset motor in response to the application to the input circuit thereof of an alternating control signal and which is characterized by the simplicity and effectiveness of the means provided for minimizing and/or eliminating relay hum.

A further object of the invention is to provide an electronic amplifier and relay arrangement in which the actuation of the relay is selectively controlled in accordance with a characteristic of an alternating current signal impressed on the input circuit of the electronic amplifier and in which simple and efficient means are provided for minimizing hum in the operation of the amplifier and relay.

In a preferred embodiment of the present invention, the electronic amplifier and relay arrangement includes a pair of relay actuating triode valves each having an anode, a cathode and a control grid and a separate inductive relay winding connected to the output circuit of each triode. The electronic amplifier and relay arrangement is so constructed and arranged that the separate inductive relay windings are adapted to be selectively actuated in accordance with the characteristics of an alternating current signal which may be impressed upon the input circuits of said valves. For the purpose of minimizing hum in the operation of the triode valves and associated relay windings there is provided a separate condenser between the anode and control grid of each triode valve. In some cases, the control grids of the triode valves may advantageously be connected to each other by a condenser. These condensers may be quite small and consequently are less expensive than the filter condenser customarily used in a shunt to relay windings to prevent hum in apparatus of this general type.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Figure 1:
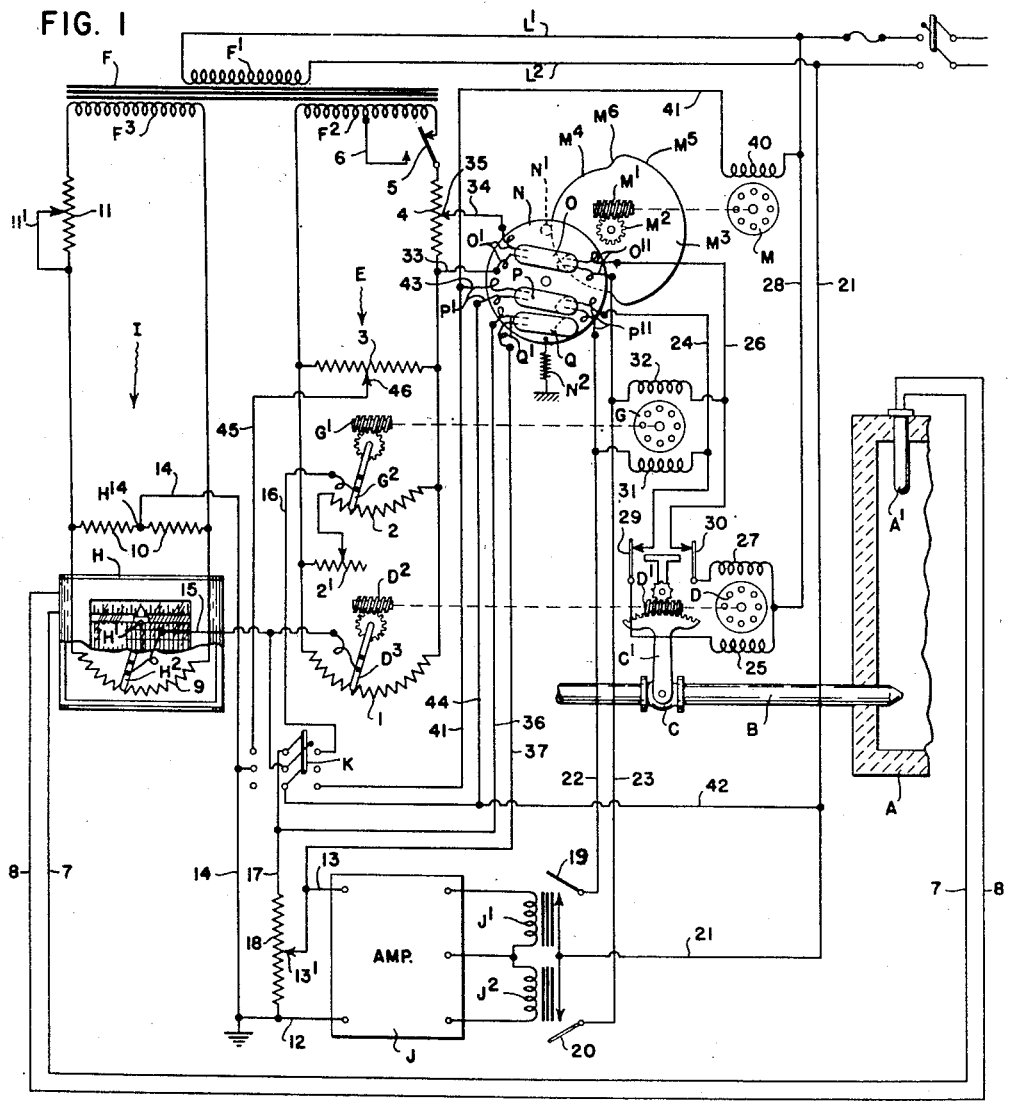
Fig. 1 is a diagrammatic representation of a preferred form of my improved control apparatus.

In Fig. 1 I have illustrated a preferred embodiment of the present invention for use in controlling the temperature in a furnace A which is heated by the combustion of fluid fuel supplied through fuel supply pipe B at a rate regulated by the adjustment of a feed valve C.

As diagrammatically shown, the adjustment of the valve C is effected by the oscillation of a valve member C' which comprises a gear segment having its gear teeth engaged by a worm D' rotated by a reversible electric valve motor D. The shaft of the motor D carries a second worm $D^2$ in mesh with teeth of a gear segment portion of a contact member $D^3$. The rotative movements of the motor D which adjust the valve C through the worm D' operate through the worm $D^2$ to effect corresponding follow-up adjustments of a contact $D^3$ along the slide wire resistance $l$ of a valve bridge circuit E, in the usual proportioning control manner.

The valve bridge circuit E is shown as energized by the secondary winding $F^2$ of a transformer F having its primary winding F' connected to alternating current supply conductors $L^1$ and $L^2$. The slide wire resistance 1 is connected to the energizing winding $F^2$ in parallel with slide wire resistors 2 and 3. As shown, the resistor 2 is manually adjustable to include more or less of a variable resistance section 2'. The bridge E also includes a sensitivity regulating resistance 4. In one condition of the apparatus all of the resistance 4 is included in the connection between one terminal of each of the resistors 1, 2 and 3 and one terminal of the energizing winding $F^2$. In another condition of the apparatus, more or less of the resistance 4 is short circuited as hereinafter described. As shown, the bridge circuit E also includes a switch 5 through which the resistance 4, and thereby the resistors 1, 2 and 3, may be connected to one end of the winding $F^2$, or may be connected through a tap 6 to an intermediate portion of the winding $F^2$.

The control apparatus shown in Fig. 1 comprises a reversible reset motor G, the shaft of which carries a worm G' in mesh with gear teeth on the hub portion of a contact arm $G^2$, which is adjusted along the resistor 2 by the motor G, when the latter is operated as hereinafter described.

As shown in Fig. 1, the controlled temperature of the furnace A is measured by a thermocouple A' having its terminals connected by conductors 7 and 8 to the terminals of an instrument H. The latter may well be, and, as shown, is, a recording potentiometer controller of known type including a marking element H' and a pivoted contact arm $H^2$. The marking element H' and pivoted contact arm $H^2$ are each adjusted by the instrument as the thermocouple voltage varies but in Fig. 1 the element H' is in its control point or normal temperature position and the contact arm $H^2$ is shown in a lower temperature position.

The contact arm $H^2$ engages the slide wire resistance element 9 of an instrument bridge circuit I which also includes a resistance 10 connected in parallel with the slide wire resistor 9 and across the bridge energizing winding $F^3$. The latter is a secondary winding of the transformer F. As shown, one terminal of the winding $F^3$ is connected to the corresponding ends of the resistances 9 and 10 through a resistance 11, more or less of which may be short circuited by a shunt 11' thereby to vary the throttling range of the control system, as hereinafter described.

Whether the control apparatus shown in Fig. 1 operates as an automatic apparatus or as a manual control apparatus depends on whether a switch K is in its position at the right or at the left, respectively, of its intermediate position shown in Fig. 1. In the automatic control position of the switch the output terminals of the valve bridge E and of instrument bridge I are connected in series in a control circuit including the input terminals 12 and 13 of an electronic amplifier J which is shown in more detail in Fig. 2. Said control circuit includes conductors 14, 15, 16 and 17. The conductor 14 connects the amplifier terminal 12 to the resistance 10 at a point midway between the ends of the latter. The conductor 15 connects the contact $H^2$ of the bridge I to the contact $D^3$ of the bridge E. The conductor 16 connects the reset contact $G^2$ to one terminal of the switch K. The latter, as shown, is a three-pole, double-throw switch. In its automatic control position one blade of the switch K connects the conductor 16 to one end of a conductor 17 having its opposite end connected to the amplifier terminal 12. As shown, the conductor 17 is directly connected to the amplifier terminal 12 through a high resistance 18 and the amplifier terminal 13 terminates in a contact 13', in sliding engagement with a portion of the resistance 18 adjacent to conductor 17. As shown, the input terminal 12 of the amplifier J, and the mid-point of the resistance 10 of the bridge I are connected to ground.

Depending upon conditions of operation hereinafter explained, the signal impressed on the input terminals 12 and 13 of the amplifier J is of one or the other of two phases which are displaced from one another by 180 degrees. When the impressed signal is of one phase, the amplifier J operatively energizes a relay winding J' and thereby closes a normally open relay switch 19. When the control signal is of the second phase, the second relay winding $J^2$ of the amplifier J is energized and closes the normally open relay switch 20.

The relay switches 19 and 20 in conjunction with cyclic operating switches O, P and Q, control the energization of the valve motor D and reset motor G. Advantageously, and as shown, switches O, P and Q are mercury switches which are periodically tilted back and forth between first and second operative positions by a constantly running timing motor M. As diagrammatically shown, the shaft of the timing motor M carries a worm M' in mesh with a gear $M^2$ carried by the shaft of a constantly rotating cam disc $M^3$. The disc $M^3$ maintains a pivoted disc N in one angular position during one half, and in a different angular position during the other half of each revolution of the disc $M^3$. As shown, the edge of the disc $M^3$ comprises two arc portions $M^4$ and $M^5$, each extending circularly about the axis of the disc $M^3$ for approximately 180°, though said portions need not be of equal angular extent.

The radius of curvature of the arc $M^4$ is shorter than that of the arc $M^5$. The adjacent ends of the edge portions $M^4$ and $M^5$ are connected by cam shoulders $M^6$. The disc N carries a pin N' which is held in engagement with the edge of the disc $M^3$ by a bias spring $N^2$. In consequence, the disc N occupies one angular position when the pin N' engages the edge portion $M^4$ and occupies a different angular position when the pin N' engages the disc edge portion $M^5$.

The envelopes or tubular bodies of the mercury switches O, P and Q are mounted on the disc N in such manner that with the pin N' in engagement with the edge portion $M^5$, the left ends of the switches O, P and Q are depressed so that the mercury partially filling each tube may connect the corresponding pair of terminals or electrodes O', P' and Q' extending into the left ends of the envelopes of the switches O, P and Q, respectively. As the pin N' moves out of engagement with the surface $M^5$ and into engagement with the surface $M^4$, the switch envelopes are tilted so that the mercury therein then passes into their depressed right ends. For a purpose hereinafter explained, the switch envelopes are preferably so relatively inclined as shown, or otherwise so arranged that the mercury connection between the contacts Q' is maintained momentarily after their clockwise tilting has disconnected contacts O' and P'. Contacts O" and P" extending into the right ends of the switches O and P are mercury connected when those switch ends are depressed. The switch Q has no contacts extending into its right end.

With the right ends of the switches O and P depressed as shown, the motor D may be energized for operation in one direction or the other by closure of one or the other of the relay switches 19 and 20, but the energization of the reset motor G is then prevented. When the left ends of the switches O and P are depressed, the motor G is energized for operation in one direction or the other by the closure of the switch 19 or the switch 20, but the energization of the valve motor D is then prevented.

The circuit connections through which the operation of the motors G and D are thus controlled by the switches 19, 20, O and P comprise circuit elements 21—30. Each of the switches 19 and 20, when in its closed position, is connected to the supply conductor L² by conductor 21. Conductor 22 connects the switch 19 to one of the terminals P" of the switch P. Conductor 23 connects the switch member 20 to one of the terminals O" of the switch O. Conductor 24 connects the second terminal P" to one terminal of field winding 25 of motor D. Conductor 26 connects the second terminal O" of the switch O to one terminal of the second field winding 27 of the motor D. Conductor 28 connects the second terminal of each of the field windings 25 and 27 to the supply conductor L'. As shown, the conductor 24 and winding 25 are connected through a normally closed limit switch 29, and the conductor 26 is connected to the winding 27 through the normally closed limit switch 30. The motor G has one field winding 31 connected between the conductors 22 and 24 and has a second field winding 32 connected between the conductors 23 and 26.

In the condition of the apparatus shown in Fig. 1 the mercury in the switch P connects the contacts P" and thereby short circuits the field winding 31. Similarly the mercury in the switch O then connects the contacts O" and thereby short circuits the field winding 32. In consequence the motor D is energized on the closure of either switch 19 and 20 while the motor G remains unenergized. When the disc N occupies its second position, so that the right ends of the switches O and P are raised, those switches no longer short circuit the field windings 31 and 32 of the motor G, and on the closure of the switch 19, the field winding 31 is then operatively energized by current flow in series through the field windings 31 and 25 between the conductors 22 and 28. Similarly, on the closure of the switch 20, the field winding 32 of the motor G is operatively energized by current flow in series through the field windings 32 and 27.

For their intended operation, the reset motor field windings 31 and 32 are so proportioned relative to the valve motor field windings 25 and 27 that the windings 31 and 32 will be energized by currents of insufficient strength to energize the windings 25 and 27, respectively. Thus, the two motors D and G are never simultaneously energized.

When turned into their positions in which the operation of the reset motor G is permitted, the switches O and Q make control circuit adjustments which augment the tendency of the amplifier J to close one or the other of the switches 19 and 20 and thus insure a corresponding operation of the reset motor G. Thus, when the left end of the switch O is lowered so that the mercury connects its contacts O', a portion of the resistance 4 in the valve bridge circuit is short circuited. This changes the potential relation previously existing between the contacts G² and D³. The short circuiting of more or less of the resistance 4 occurring when the left end of the switch O is depressed results from the fact that one end of the resistance 4 is connected by conductor 33 to one of the switch contacts O' while the other switch contact O' is connected by a conductor 34 and a slider contact 35 to the resistance 4 at a variable point displaced from the point to which the conductor 33 is connected. The actual magnitude of the end portion of resistance 4 then short circuited depends, of course, upon the adjustment of the slider contact 35.

The lowering of the left end of the switch Q increases the sensitivity of the amplifier J by making the potential difference between the input terminals 12 and 13 of the amplifier J equal to the full potential difference between the conductors 14 and 17. The switch accomplishes this by short circuiting the portion of the resistance 18 which is normally interposed between the conductor 17 and the amplifier terminal 13. That portion of the resistance 18 is short circuited when the left end of the switch Q is depressed by a short circuiting shunt comprising conductors 36 and 37 and the contacts Q'. The conductor 36 connects one of the contacts Q' to the conductor 17 and the conductor 37 connects the second contact Q' to the amplifier terminal 13.

The switch P serves to insure that when the switch K is adjusted from its automatic control position to its manual control position, the timing motor M will not stop in a position in which the switches O and Q will short circuit portions of the resistances 4 and 18, respectively. When the switch K is turned into its manual control position it opens the normal energizing circuit for the motor M. That circuit includes the field winding 40, which has one terminal connected to the supply conductor L¹, and a conductor 41 which connects the other terminal of winding 40 to one terminal of the switch K. That switch terminal is connected by the lower blade of the switch K to a conductor 42 when the switch K is in its automatic control position. The conductor 42 connects the lower blade of the switch K to the conductor 21 and thereby to the supply conductor L².

If the switch P has its left end elevated when the switch K is turned from its automatic position into its manual control position, the operation of the motor M is immediately interrupted, If, however, the switch K is adjusted from its automatic control position into its manual control position at a time when the left end of the switch P is depressed, the last mentioned switch operates to maintain the energization of the motor M until the edge portion M⁴ of the disc M³ is turned into the position in which it permits the disc N to turn clockwise and thereby raise the left end of the switch P. The switch P prolongs the energization of the timing motor M, as just described, by virtue of the fact that one of the contacts P' of the switch P is connected by a conductor 43 to the conductor 41 while the second contact P' is connected by a conductor 44 to the conductor 42.

In the normal operation of the apparatus shown in Fig. 1 with the switch K in its right-hand or automatic control position, and with stable operating conditions, the thermocouple A' will be at the desired temperature and the instrument marking element H' and contact H² will be in their control point positions, assumed herein to be their mid positions. In consequence there will then be no potential difference between the output terminals H¹⁴ and H² of the instrument bridge I, or between the output terminals G² and D³ of the valve bridge E. In consequence there will then be no potential difference between the amplifier input terminals 12 and 13. On a decrease in thermocouple temperature, the corresponding adjustment of the contact H², assumed to be in the clockwise direction, unbalances the control circuit. The resultant signal current flow between the conductors 14 and 17 will be in the phase relation to the supply conductor voltage required to energize the relay winding J'. The phase of the signal potential on a control temperature increase is that required to energize the relay winding J².

When unbalanced as just described, the control apparatus cannot be stabilized in a rebalanced condition without adjustment of the fuel valve C effected by operation of the motor D. Ordinarily the initial operation of the motor D will give the contact D³ the movement required to neutralize the signal potential previously impressed upon the amplifier. However, when thereafter the timing motor M short circuits the resistance 4, the control system is thereby again unbalanced, and the reset motor G then operates to adjust the contact G² in the direction to dissipate the bridge rebalancing action produced by the preceding operation of the valve motor D. Subsequently, when the timing motor M opens the short circuit about the resistance 4, the motor control circuit is again unbalanced, and the valve motor D is again energized for operation in the direction to give the fuel valve C a further adjustment in the direction of its original adjustment.

Thus in rebalancing the control apparatus following a furnace load change a series of reset adjustments are made by the reset motor G. Those adjustments are effected during regularly recurring periods and the magnitude of each is proportional to the existing deviation of the actual furnace temperature from the normal or control value of that temperature. In consequence the aggregate or total reset adjustment made as a result of a load change is made at a rate dependent on the deviation, during the time required for such aggregate adjustment, of the actual furnace temperature from the normal or control point temperature.

The increase in relay sensitivity, effected when a portion of the resistance 18 is short circuited, contributes to the accuracy of control of the resetting operations. Furthermore, with the switches arranged as previously explained so that when the disk N is tilted clockwise the movement of the mercury in the switch Q is slower than in the switches O and P, the control motor D may be operatively energized before the sensitivity of the amplifier J is reduced. In consequence, the appropriate relay J' or J² may then be momentarily energized as a result of an extent of unbalance in the control circuit which would be too small to energize the relay if the amplifier had only the sensitivity maintained during the periods in which the resistance 18 is not short circuited. The lag in the reduction in the amplifier sensitivity occuring when the switch Q is tilted clockwise thus contributes to improved valve control by avoiding or minimizing objectionable dead zone interference with the desired control operations.

The manual adjustment of the shunt 11' to increase or decrease the resistance 11 in the instrument bridge circuit I respectively decreases or increases the potential drop in the bridge circuit resistances 9 and 10. The effects of thus increasing or decreasing the potential drop along the slide wire resistance 9, is to respectively decrease or increase the throttling range of the control apparatus.

The manual adjustment which increases or decreases the amount of the resistance 2' in series with the slide wire resistor 2 respectively increases or decreases the amount of movement of the reset motor G is required to rebalance the system when, following an adjusting operation of the motor D, the timing motor moves switches O, P and Q counter-clockwise and thereby unbalances the bridge circuit E by short circuiting more or less of the resistance 4 while at the same time conditioning the reset motor G for operation.

When the switch K is adjusted into its left-hand or manual control position it eliminates the control functions and capacities which the reset contact G² and the instrument contact H² have while the switch K is in its right-hand or automatic control position. The contact G² is thus rendered inoperative by the disconnection of the conductors 16 and 17. When the switch K is turned into its left-hand position, it connects the conductor 17 to a conductor 45 and thereby to a slider contact 46 which is manually adjustable along the slide wire resistance 3 of the valve bridge E. In the manual control condition of the apparatus shown in Fig. 1 a signal potential is impressed on the amplifier terminals 12 and 13 through the slide wires 1 and 3 at times when there is a potential difference between contacts D³ and 46. Whether the phase of the signal potential then impressed on the amplifier terminals 12 and 13 is that required to energize the relay winding J' or relay winding J² depends upon whether the potential difference between the contacts D³ and 46 is in a direction to be eliminated by a clockwise or a counter-clockwise adjustment of the contact arm D³.

In the manual control condition of the apparatus shown in Fig. 1, there is no automatic reset, and an increase or decrease in the heat requirement or load of the furnace A tends to cause a decrease or an increase, respectively, in the temperature of the thermocouple A'. Variation in the furnace heat requirement can be compensated for so as to maintain the temperature of thermocouple A' approximately constant by suitable adjustments of the contact 46 along the slide wire 3. With a constant furnace load, a manual adjustment of the contact 46 along the resistance 3 is in effect a control point adjustment which varies the temperature at which the thermocouple A' is maintained.

Figure 2:
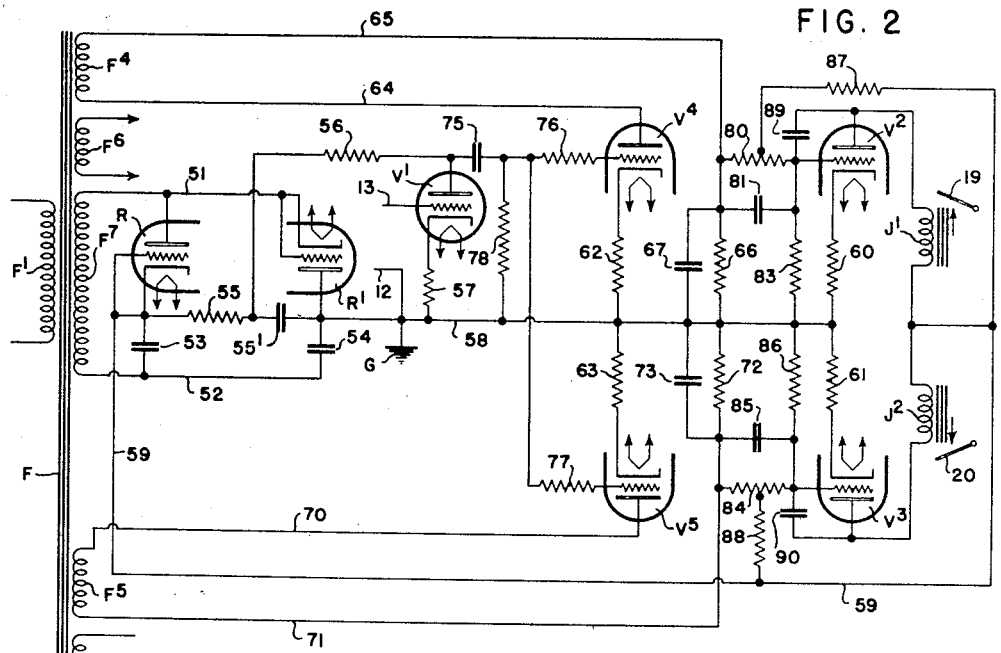
Fig. 2 is a diagram illustrating details of an amplifier circuit arrangement included in the apparatus shown in Fig. 1.

While for the general purposes of the control apparatus shown in Fig. 1 the amplifier J may take varying forms, special advantages are obtained with an amplifier J of the type illustrated in Fig. 2. In the amplifier arrangement shown in Fig. 2, the amplifier input terminal 13 is directly connected to the control grid of an amplifying triode V', and the terminal 12 is connected through a biasing resistance 57 to the cathode of the triode V'. Two triodes R and R' are used in Fig. 2 as rectifiers to provide unidirectional voltage for energizing the plate circuit of the amplifier triode V', and for energizing the plate circuits of relay energizing triodes V² and V³. Alternating voltage is applied to the plate circuits of voltage amplifier triodes V⁴ and V⁵ from secondary windings F⁴ and F⁵, respectively, of the transformer F, in such manner that the respective voltages on the plates of the triodes V⁴ and V⁵ are 180° out of phase.

In the arrangement shown, when the triode V' impresses no signal on the control grids of the triodes V⁴ and V⁵, those triodes conduct sufficient current to maintain the triodes V² and V³ substantially non-conductive, so that both relays J' and J² are then deenergized. On the assumptions made above, a drop in the temperature of the thermocouple A' results in the impression of a signal on the control grids of the triodes V⁴ and V⁵ of such phase that the control grid of the triode V⁴ is driven in the negative direction during the half cycle that its plate is positive. The triode V⁴ then becomes substantially non-conductive with the result that the triode V² then becomes conductive and energizes the relay winding J'. When a signal of opposite phase is impressed on the control grids of the triodes V⁴ and V⁵, the control grid of triode V⁵ is driven negative during the half cycle that its plate is positive. This makes the triode V³ conductive and effects the energization of the relay winding J².

As shown, the transformer F includes a secondary winding F⁶, the purpose of which is to provide heating current to the cathode heating filaments of the various valves R and R', V', V², V³, V⁴, and V⁵. The rectifier triodes R and R' are energized by alternating current supplied by a secondary winding F⁷ of the transformer F. One terminal of the winding F⁷ is directly connected through a conductor 51 to the anode of the triode R, and to the cathode and control grid of the triode R'. The second terminal of the transformer winding F⁷ is connected by a conductor 52 to one terminal of each of condensers 53 and 54. The second terminal of the condenser 53 is connected to the cathode of the rectifier triode R, and the second terminal of the condenser 54 is connected to the anode of the triode R'. The cathode of triode R is connected through a resistance 55 and a condenser 55' to the anode of the triode R'. The connected terminals of the resistance 55 and condenser 55' are connected by a resistance 56 to the anode of the amplifier triode V'. The cathode of the triode V' is connected through resistance 57 to a conductor 58 and thereby to the anode of triode R' and to the end of the resistance 18 to which the amplifier input terminal 12 is connected.

As will be apparent, the transformer secondary F⁷, the valves R and R' and the condensers 53 and 54 form a so-called voltage doubler circuit which supplies suitably high D. C. voltage to the plate circuits of the triodes V² and V³. The negative terminal of the doubler circuit is connected by the conductor 58 and resistances 60 and 61 to the cathodes of the triodes V² and V³, respectively. The positive terminal of the doubler circuit is connected by the conductor 59 to the connected terminals of the relay coils J' and J² which have their other terminals connected to the anodes of the triodes V² and V³, respectively.

The conductor 58 is also connected through the resistances 62 and 63 to the cathodes of the triodes V⁴ and V⁵, respectively. One terminal of the transformer secondary F⁴ is connected to the anode of the triode V⁴ by a conductor 64 and the other terminal of the secondary F⁴ is connected by a conductor 65, a resistance 66, and a condenser 67 in shunt with said resistance, to the conductor 58, and is thereby connected through the resistance 62 to the cathode of the triode V⁴. One terminal of the transformer secondary F⁵ is connected by a conductor 70 to the anode of the triode V⁵, and the other terminal of the secondary F⁵ is connected by a conductor 71 and resistance 72, and a condenser 73 in parallel with the resistance 72, to the conductor 58, and is thereby connected through the resistance 63 to the cathode of the triode V⁵.

The output circuit of the triode V' is coupled to the input circuits of the tubes V⁴ and V⁵ by means including a condenser 75 which has one terminal connected to the anode of the tube V'. The other terminal of the condenser 75 is connected to the control grid of the tube V⁴ through a resistance 76 and is connected to the control grid of the tube V⁵ through a resistance 77, and is connected through a resistance 78 to the conductor 58. The conductor 58 as previously explained, is connected to the cathode of triode V' by the resistance 57, and is connected to the cathodes of triodes V⁴ and V⁵ by the resistances 62 and 63, respectively.

In addition to the resistance 66 and condenser 67, the coupling connection between the output circuit of the triode V⁴ and the input circuit of the triode V² includes a resistance 80 and a condenser 81 connected in parallel with said resistance between the conductor 65 and the control grid of the triode V². Said control grid is also connected through a resistance 83 to the conductor 58 and thereby through the resistance 60 to the cathode of the triode V². Similarly, the output circuit of the triode V⁵ is connected to the input circuit of the triode V³ by coupling means including the previously mentioned resistance 72 and condenser 73, and also including a resistance 84 and a condenser 85 in parallel with said resistance which connect conductor 71 to the control grid of the triode V³. That control grid is also connected by a resistance 86 to the conductor 58 and thereby through resistance 61 to the cathode of the triode V³. The control grids of the triodes V² and V³ are subjected to a positive biasing action by resistances 87 and 88 which connect the conductor 59 to said control grids through intermediate points of the resistances 80 and 84, respectively.

A condenser 89 is connected between the control grid and anode of triode V² and a condenser 90 is connected between the control grid and anode of the triode V³. With substantially smooth rectified current supplied to the output circuits of the triodes V² and V³, the condensers 89 and 90 serve as degenerative couplings which tend to eliminated relay hum. The condensers 89 and 90 may be quite small and therefore are less expensive than the filter condensers customarily used in shunt to relay windings to prevent hum in apparatus of this general type. Said condensers should have as small a time constant as possible to avoid sluggishness in relay operation and still avoid relay chatter.

As previously stated, when no signal is impressed on their control grids, the triodes V⁴ and V⁵ are conductive and the voltage drops through the resistances 66 and 72 lower the potentials of the control grids relative to the cathodes of the valves V² and V³ which are then practically non-conductive. In consequence, the relay windings J' and J² are then deenergized. When a signal of the proper phase is impressed on the input circuit of triode V⁴ the latter becomes non-conductive because its control grid is driven negative during the half cycle in which the corresponding anode is positive. The resultant reduction in the potential drop in resistance 66, permits a plate current flow through the triode V² which energizes the relay winding J'. The relay winding J² is similarly energized when a control signal of proper phase is impressed on the control grid of the valve V⁵ and the decreased potential drop in resistance 72 makes triode V³ conductive.

The described coupling circuit connections between the output circuits of the triodes V⁴ and V⁵ and the input circuits of the triodes V² and V³, respectively, serve the purpose of causing the relay windings J' and J² to be deenergized at the instant that the control circuit is rebalanced or even during the period in which its rebalance is being effected but has not been completed. The described coupling connections accentuate the effect of both a rising and a falling signal voltage on the input circuits of the triodes V² and V³. Consider for example, the action which occurs when, following a load change which makes the valve V⁴ practically non-conductive and makes the valve V² conductive, the apparatus again approaches balance and the current in the output circuit of the tube V⁴ begins to increase. As that current builds up, the resistance 66, the condenser 67 in parallel therewith, the condenser 81, and the associated resistances 80 and 83 connected to the control grid of the valve V², coact to expedite the rate at which the potential of said control grid becomes increasingly negative relative to the cathode of the valve V².

As the control apparatus approaches balance, the coupling connections between the valves V⁴ and V⁵, respectively, operate not only to increase the rapidity with which the control grid of one of the valves V² and V³ becomes increasingly negative relative to the corresponding cathode, but also to make the control grid of the other valve more positive relative to the cathode of that valve. It is possible by a suitable selection of circuit component values, not only to deenergize the previously energized relay J' or J², but also to momentarily energize the other of those relays, prior to the complete rebalancing of the control apparatus. The momentary energization of the other relay as just described, energizes the control motor for operation in the reverse direction and thereby subjects the motor to a positive braking action practically eliminating the tendency of the motor to coast.

The action of the valve coupling provisions just described contributes to a reduction in the length of the individual adjustment steps effected as balance of the control apparatus is approached, following the unbalancing of the apparatus by a load change. As those skilled in the art will recognize, the reduction in the individual magnitude of the final rebalancing adjustment steps contributes to efficient control by reducing the tendency to overtravel, and objectionable dead zone effects.

As those skilled in the art will understand, the values of capacitances and resistances associated with the control grids of the valves V² and V³ may vary widely with conditions, but by way of illustration and example, and not by way of limitation, I note that in a system energized by 60 cycle alternating current, the resistances 66, 72, 83 and 86 may each have a value of 1 megohm, each of the condensers 67 and 73 may have a capacitance of .25 mfd., each of the condensers 81 and 85 may have a capacitance of .1 mfd., and resistances 80 and 84 may each have a value of 5 megohms.

Figure 3:
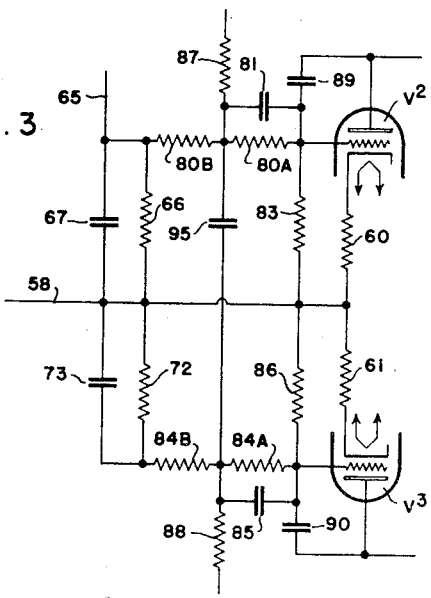
Fig. 3 is a diagram illustrating a modification of the amplifier shown in Fig. 2.

The capacitance and resistance values just stated are also suitable for operation when the apparatus is energized by 25 cycle alternating current, but in such case it is desirable to connect the grid circuits of the valves V² and V³ by a condenser 95, as shown in Fig. 3. In respect to hum reduction, the Fig. 3 arrangement also differs advantageously from that shown in Fig. 2 in the replacement of resistance 80 by separate resistances 80A and 80B, and the replacement of resistance 84 by separate resistances 84A and 84B, and I now prefer the Fig. 3 arrangement without the condenser 95, to the Fig. 2 arrangement for sixty cycle operation.

In addition to its operating advantages, the amplifier arrangement shown in Fig. 2 has the practically important safety advantage that if any one of the tubes of the amplifier should fail or be withdrawn from its socket, no objectionable motor operation will result. As previously explained, the triodes V⁴ and V⁵ are normally conductive, the triodes V² and V³ are normally non-conductive, and the relay windings J' and J² are normally deenergized. Ordinarily, the triodes V² and V³ will be contained in the same bottle, and if that bottle is withdrawn from its socket no relay or motor operation will result. Furthermore, if the triodes V² and V³ are in separate bottles, the withdrawal of either bottle from its socket or the failure of the triode therein, can produce no objectionable operation since that triode is normally inoperative.

If the pre-amplifier tube V' should fail, no energization of either relay winding J' or J² and hence no operation of either motor D or G will result, because the triodes V² and V³ are normally non-conductive.

With triodes V⁴ and V⁵ contained in the same bottle, the withdrawal of the bottle from its socket will not result in motor operation, since both of the triodes V² and V³ will then be conductive and both relay windings J' and J² will be energized and this results in motor energization for operation in each direction and thus prevents motor operation in either direction.

If one only of triodes V⁴ and V⁵ should fail or be removed, the corresponding tube V² or V³ will be rendered conductive and the corresponding relay winding J' or J² will then be energized and cause motor operation in one direction. Such motor operation, however, unbalances the control circuit in the proper direction to cause the other triode V⁵ or V⁴ to become non-conductive and thereby to cause the other triode V³ or V² to become conductive. When this occurs both of the relay windings will be simultaneously energized and when one winding of the motor is energized the second winding of the motor is also energized, the motor stalls.

Figure 4:
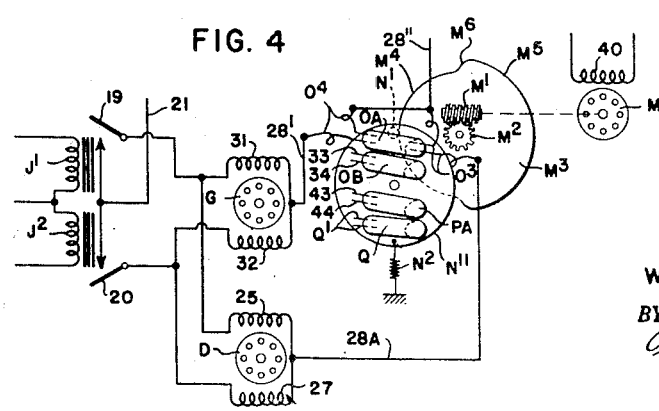
Fig. 4 is a diagram illustrating a modification of a portion of the control apparatus shown in Fig. 1.
Figure 5:
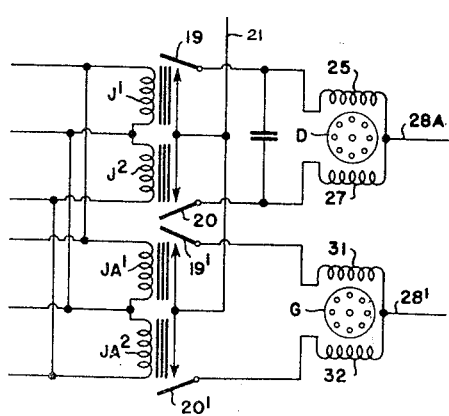
Fig. 5 shows a modification of the apparatus shown in Fig. 4.

Various modifications of the apparatus shown in Fig. 1 may be made, and two such modifications are shown by way of example in Figs. 4 and 5. In the arrangement shown in Fig. 4 the field winding 25 of the motor D has one terminal connected to the relay switch 19 and the field winding 27 has one terminal connected to the relay switch 20 and each of said switches when in its closed condition is connected to the conductor 21 which may be connected to the supply conductor L² as in the arrangement shown in Fig. 1. The second terminals of the windings 25 and 27 are connected by a conductor 28A to one of the terminals O³ extending into the right end of the mercury switch OA. The cooperating switch terminal O³ is connected to a conductor 28'' which may be connected to the supply conductor L' to which the conductor 28 of Fig. 1 is connected. In Fig. 4 one terminal of the reset motor field winding 31 is connected to the relay switch 19 and one terminal of the reset motor winding 32 is connected to the relay switch 20. The other terminals of the windings 31 and 32 are connected by a conductor 28' to one of a pair of switch terminals O⁴ extending into the left end of the mercury switch OA. The second terminal O⁴ is connected to the previously mentioned conductor 28''.

The mercury switch OA and associated mercury switches OB, PA and Q are shown in Fig. 4 as mounted on an oscillating disc N'' which may be similar to the disc N of Fig. 1, and may be oscillated in the same manner by a timing motor M, when the latter is energized. The switch OB has terminals extending into its left end only and those terminals are connected to the conductors 33 and 34 as are the terminals O' of the switch O of Fig. 1. The switch PA of Fig. 4 differs from the switch P of Fig. 1 in that it has no terminals extending into its right end. The left end terminals of the switch PA are connected to conductors 43 and 44 as and for the same purpose as in Fig. 1. The switch Q of Fig. 4 may be identical in form and function with the switch Q of Fig. 1.

The arrangement shown in Fig. 4 differs operatively from that shown in Fig. 1 in that the field windings 25 and 27 of the valve motor D and the field windings 31 and 32 of the reset motor G are energized independently, and in such manner that there is no current flow through the windings 25 and 27 during the periods in which the windings 31 and 32 are energized.

The apparatus illustrated in Fig. 5 differs from that illustrated in Fig. 4, in that the reset motor field windings 31 and 32 are connected to relay switch members 19' and 20', respectively, which are separate from the relay switch members 19 and 20 to which the field windings of the motor D are connected. As shown in Fig. 5, the switches 19' and 20' are closed by energization of relay windings JA' and JA², respectively, which are connected in parallel with the windings J' and J² to the same energizing means.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention what I claim as new and desire to secure with Letters Patent is:

1. Control apparatus comprising in combination, a relay actuating triode valve having an anode, a cathode and a control grid, and having an output circuit including said anode and cathode and an input circuit including said cathode and grid, means responsive to a change in a controlling condition for impressing a direct current signal on the input circuit of said valve, said signal having an extraneous alterating current ripple component of appreciable magnitude, an inductive relay winding connected to the output circuit of said triode, means to supply substantially ripple-free direct current to the output circuit of said triode, and means for minimizing hum in the operation of said triode and associated relay winding due to said alternating current signal component comprising a condenser connected between the anode and control grid of said triode.

2. Control apparatus comprising in combination a pair of relay actuating triode valves each having an anode, a cathode and a control grid and having an output circuit including said anode and cathode and an input circuit including said cathode and grid, means selectively responsive to one or another change in a controlling condition for impressing a direct current signal on the input circuit of one or another of said valves, said signal having an extraneous alternating current ripple component of appreciable magnitude, a separate inductive relay winding connected to the output circuit of each triode, means to supply substantially ripple-free direct current to said output circuits of said triodes, and means for minimizing hum in the operation of said triodes and associated relay windings due to said alternating current signal component comprising a separate condenser connected between the anode and control grid of each of said triodes and a third condenser connecting the control grids of said two triodes.

3. Control apparatus comprising in combination a pair of phase discriminating triode valves each having an anode, a cathode, a control grid, an output circuit including said anode and cathode and an input circuit including said cathode and grid, means through which there is adapted to be supplied to the output circuit of each of said valves alternating current which is displaced 180° in phase from the current which is supplied to the output circuit of the other valve, means responsive to a change in a controlling condition for impressing an alternating current signal on the input circuits of said valves, said signal being in phase with the current supplied to the output circuit of one or the other of said valves depending on the direction of said change, a pair of relay actuating triode valves each having an anode, a cathode, a control grid, an output circuit including said anode and cathode and an input circuit including said cathode and grid, coupling means coupling the output circuit of one of said phase discriminating triodes to the input circuit of one of said relay actuating triodes and coupling means coupling the output circuit of the second of said phase discriminating triodes to the second of said relay actuating triodes, a pair of inductive relay windings, one connected to the output circuit of one, and the other connected to the output circuit of the second of said relay actuating triodes, means to supply direct current to the output circuit of each of the last mentioned triodes, and means for minimizing hum in the operation of the last mentioned triodes and associated relay windings comprising a separate condenser connected between the anode and control grid of each of the second mentioned triodes.

4. Control apparatus combination as specified in claim 3, in which said hum minimizing means also includes a condenser and resistance connecting the grids of said relay actuating triodes.

5. Control apparatus comprising a relay actuating triode valve having an anode, a cathode, and a control grid, and having an output circuit including said anode and said cathode and an input circuit including said cathode and said control grid, means responsive to a change in a controlling condition and operative to impress an electrical signal on said input circuit, said signal having a direct current controlling component of a magnitude which is a function of said condition change and having an extraneous alternating current ripple component, an electromagnetic relay having an electromagnetic operating winding and contact means adapted to be actuated into predetermined conditions by predetermined changes in the magnitude of direct current flowing through said winding, said winding producing an undesirable chattering action of said contact means in the presence of alternating current flowing through said winding, a source of substantially ripple-free direct current, circuit means connecting said output circuit and said winding in series across said source, whereby there is produced through said winding a current flow of a magnitude which is a function of the magnitude of said signal impressed on said input circuit, and a condenser connected between said anode and said control grid and operative to prevent the alternating current component of said signal from producing a corresponding flow of alternating current of significant magnitude through said winding, whereby said contact means are actuated in a chatter-free manner solely in accordance with the magnitude of the direct current component of said signal, and hence in accordance with said condition change, independently of the presence of the alternating current component of said signal.

WILLIAM H. WANNAMAKER, Jr.

REFERENCES CITED

The following references are of record in the file of this patent:

UNITED STATES PATENTS

| Number | Name | Date |
|---|---|---|
| 1,931,648 | Dyksterhuis | Oct. 24, 1933 |
| 1,986,331 | Farnsworth | Jan. 1, 1935 |
| 2,256,304 | Wills | Sept. 16, 1941 |
| 2,280,822 | Hansell | Apr. 28, 1942 |
| 2,282,706 | Chireix et al. | May 12, 1942 |
| 2,345,399 | Jones | Mar. 28, 1944 |
| 2,357,745 | Kliever | Sept. 5, 1944 |
| 2,366,500 | Eastin | Jan. 2, 1945 |
| 2,425,734 | Gille | Aug. 19, 1947 |

OTHER REFERENCES

Terman, "Radio Engineers' Hand Book," page 398, Fig. 34b, first edition, 1943, McGraw Hill Book Co.